(12) United States Patent
Wang et al.

(10) Patent No.: US 10,597,518 B2
(45) Date of Patent: Mar. 24, 2020

(54) SOLID POLYMER ELECTROLYTE FOR ELECTROCHROMIC DEVICES

(71) Applicant: Furcifer Inc., Menlo Park, CA (US)

(72) Inventors: Chao Wang, Menlo Park, CA (US); Yan Zhou, Fremont, CA (US)

(73) Assignee: Furcifer Inc., Fremont, CA (US)

( * ) Notice: Subject to any disclaimer, the term of this patent is extended or adjusted under 35 U.S.C. 154(b) by 65 days.

(21) Appl. No.: 15/487,325

(22) Filed: Apr. 13, 2017

(65) Prior Publication Data

US 2017/0299932 A1    Oct. 19, 2017

Related U.S. Application Data

(60) Provisional application No. 62/323,407, filed on Apr. 15, 2016.

(51) Int. Cl.

| | |
|---|---|
| *G02F 1/15* | (2019.01) |
| *C08K 5/315* | (2006.01) |
| *C09K 9/02* | (2006.01) |
| *C08K 3/18* | (2006.01) |
| *G02F 1/1523* | (2019.01) |
| *H01B 1/12* | (2006.01) |

(52) U.S. Cl.
CPC ............. *C08K 5/315* (2013.01); *C08K 3/18* (2013.01); *C09K 9/02* (2013.01); *G02F 1/1525* (2013.01); *H01B 1/122* (2013.01); *G02F 2001/164* (2019.01)

(58) Field of Classification Search
CPC ........................................... G02F 1/15
USPC ........................................... 359/265
See application file for complete search history.

(56) References Cited

U.S. PATENT DOCUMENTS

| | | |
|---|---|---|
| 5,253,100 A | 10/1993 | Yang et al. |
| 5,825,526 A | 10/1998 | Bommarito et al. |
| 7,864,398 B2 | 1/2011 | Dozeman et al. |
| 8,638,487 B2 | 1/2014 | Veerasamy |
| 9,778,533 B2 | 10/2017 | Bertolini |
| 2006/0262377 A1 | 11/2006 | Kojima |
| 2007/0153355 A1 | 7/2007 | Huang et al. |
| 2009/0029263 A1* | 1/2009 | Zaghig .................. C08J 5/2268 429/303 |
| 2014/0327950 A1* | 11/2014 | Trajkovska-Broach .................... G02F 1/1523 359/265 |
| 2017/0298682 A1 | 10/2017 | Wang et al. |

FOREIGN PATENT DOCUMENTS

| | | |
|---|---|---|
| WO | 2014/121263 A1 | 8/2014 |
| WO | 2017218682 A1 | 12/2017 |

OTHER PUBLICATIONS

Non-Final Office Action dated May 21, 2018, issued in U.S. Appl. No. 15/399,852.
International Search Report and Written Opinion for Application No. PCT/US2017/037510, dated Oct. 17, 2017, 9 pages.
Final Office Action dated Sep. 5, 2018, issued in U.S. Appl. No. 15/399,852.

* cited by examiner

*Primary Examiner* — James C. Jones

(57) ABSTRACT

The disclosure relates generally to a solid polymer electrolyte for use in electrochromic devices. The solid polymer electrolyte may include a polymer framework, at least one solid plasticizer, and at least one electrolyte salt.

20 Claims, 3 Drawing Sheets

SOLID POLYMER ELECTROLYTE FOR ELECTROCHROMIC DEVICES

CROSS-REFERENCE TO RELATED APPLICATIONS

This application is based on and claims priority to U.S. Provisional Application No. 62/323,407, filed Apr. 15, 2016, titled "Solid Polymer Electrolyte for Electrochromic Devices." The entire content of the above-referenced application is incorporated herein by reference.

FIELD OF THE INVENTION

The invention relates generally to a solid polymer electrolyte, for example, for use in electrochromic devices.

BACKGROUND

Electrochromism generally refers to the reversible change in the optical properties of a material upon application of a potential. In particular, electrochromic materials exhibit a reversible color change due to an electrochemical reduction-oxidation (redox) reaction caused by application of an electric field.

Electrochromic materials may include both organic and inorganic materials. For instance, electrochromic materials may include inorganic metal oxides, conductive polymers, and organic materials such as viologen, anthraquinone, phenocyazine, etc. Conjugated, conductive polymers may be particularly useful as electrochromic materials due to their wide range of color tenability, ease of processing, low operational voltages, and color retention.

Electrochromic materials are commonly used in electrochromic devices. A typical electrochromic device includes a four layer assembly: (i) a first transparent electrically conductive film, (ii) an electrochromic material deposited on the first conductive film, (iii) a second transparent electrically conductive film spaced apart from the first conductive film, and (iv) an ionic conductive medium (electrolyte) disposed between the first and second conductive films. It has been found that the inclusion of only one electrochromic film may result in electrochromic devices with shortened lives. Accordingly, a second electrochromic material film may be deposited on the second conductive film noted above to facilitate completion of the redox process in the device and reduce or eliminate degradative reactions in the electrolyte. This five layer assembly may be used to obtain two mixed colored states or, may, using two materials with complementary optical characteristics, enhance the contrast between the previously defined states.

There are several problems associated with known electrochromic devices and/or the components thereof. U.S. Pat. No. 5,441,827 (Graetzel, et al.) discloses one such electrochromic device in which a layer of an electrochemically active semiconductor oxide is coated onto the surface of an electrode, where the semiconductor oxide layer is in the form of a porous nanostructure formed of sintered colloidal particles. The device in the '827 patent also uses a lithium salt in an organic solvent as a liquid electrolyte. This device has several disadvantages, such as a low quenching rate, the present of residual images after quenching, decomposition of organic materials during repeated developing/quenching cycles, evaporation and exhaustion of the organic solvent, leakage of the liquid electrolyte, and inability to form thin film or film-shaped products.

U.S. Pat. No. 5,827,602 (V. R. Koch, et al.) discloses an aluminum chloride-1-ethyl-3-methylimidazolium chloride (AlCl-EMICl) ionic liquid including a strong Lewis acid as a liquid electrolyte. As the AlCl-EMICl ionic liquid has no vapor pressure, it reduces and/or eliminates issues related to electrolyte exhaustion and decomposition. However, disadvantages associated with AlCl-EMICl include the emission of toxic gases upon exposure to a small amount of moisture or oxygen, a high reactivity with organic/inorganic compounds added to the electrolyte, and decomposition at temperatures of 150° C. or higher.

U.S. Pat. No. 6,667,825 (Wen Lu, et al.) discloses an electrochromic device utilizing two conjugated polymer coated ITO-coated glass electrodes, and an ionic liquid such as [BMIM][$BF_4$] as the electrolyte. The [BMIM][$BF_4$] liquid electrolyte of the '825 patent does not include a Lewis acid, which results in improved stability and lifespan of the electrochromic device. Further, the electrochromic device of the '825 patent may avoid, at least in part, issues arising with residual images after quenching and electrolyte decomposition that are typically are found in devices using organic solvent-based liquid electrolytes and ionic liquid electrolytes containing a Lewis acid. However, the electrochromic device of the '825 patent is still subject to problems associated with leakage of the liquid electrolyte, and the inability to be formed into thin films and film-shaped products.

Accordingly, there is a need in the art for an improved electrolyte suitable for use in electrochromic devices.

BRIEF SUMMARY

In one embodiment, a solid polymer electrolyte configured for ion transport in an electrochromic device comprises a polymer framework, one or more solid plasticizers, and one or more electrolyte salts.

In another embodiment, an electrochromic device comprises a first electrode, a second electrode, an electrochromic material deposited on at least the first electrode, and a solid polymer electrolyte disposed between the electrochromic material and the second electrode. The solid polymer electrolyte comprises a polymer framework, one or more solid plasticizers, and one or more electrolyte salts.

Other objects, features and advantages of the described preferred embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which.

DETAILED DESCRIPTION OF THE PREFERRED EMBODIMENTS

Figure 1:
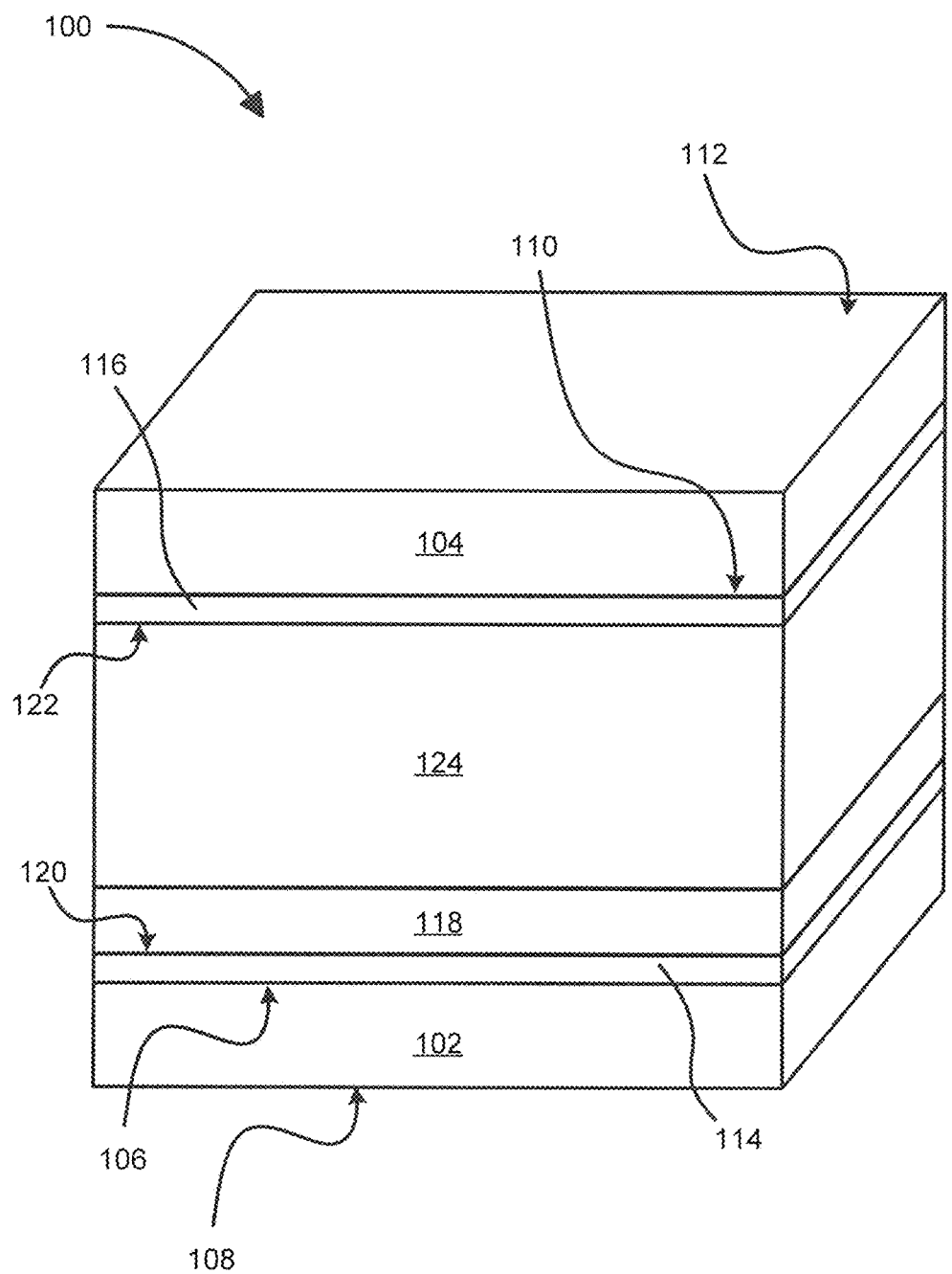
FIG. 1 is a sectional view of a simplified schematic of an electrochromic device comprising a solid polymer electrolyte therein, according to one exemplary embodiment.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Embodiments disclosed herein are directed to solving the problems associated with current electrochromic devices using conventional liquid or polymer electrolytes. For instance, embodiments disclosed herein are directed to a novel solid polymer electrolyte for use in an electrochromic device, where the solid polymer electrolyte is impregnated with a small amount of additive and metal salts. The embodiments of the disclosed electrochromic device avoid the problems associated with current electrochromic devices, such as electrolyte leakage, low ion conductivity, inability to be formed into thin films or thin-film shaped products, low adhesion, and issues with printing processing.

The following description discloses several preferred embodiments of a solid polymer electrolyte, as well as methods and device for making and using the same.

Solid Polymer Electrolyte

The present disclosure is generally directed to a solid polymer electrolyte that is transparent and has a sufficient ionic conductivity to facilitate ion transport in an electrochromic device.

In one embodiment, the solid polymer electrolyte includes a polymer framework, at least one solid plasticizer, and at least one electrolyte salt. In some embodiments, the polymer framework may include a polar polymer material. Preferably, the polar polymer material may have an average molecular weight of about 10,000 Daltons or greater. In particular embodiments, the polar polymer material may have an average molecular weight in a range from about 10,000 Daltons to about 800,000,000 Daltons. In some embodiments, the polar polymer material may be present in an amount ranging from about 15 wt. % to about 80 wt. % based on the total weight of the solid polymer electrolyte.

The presently disclosed polar polymer material may include one or more polar polymers, each of which may include one or more of: C, N, F, O, H, P, F, etc. Suitable polar polymers may include, but are not limited to, polyethylene oxide, poly(vinylidene fluoride-hexafluoropropylene, poly (methyl methacrylate), polyvinyl nitrile, combinations thereof, etc. In embodiments where a plurality of polar polymers is present, the polymers may be crosslinked to form a network having enhanced mechanical properties.

The polar polymer material may have a sufficient amorphicity so as to achieve sufficient ion conductivity. Amorphous polymer materials typically exhibit high ion conductivities. Accordingly, in some embodiments, the polar material disclosed herein may have an amorphous, or a substantially amorphous, microstructure.

In some embodiments, the polar polymer material may have a semi-crystalline or crystalline microstructure. In such cases, various modifications may be implemented with respect to the polymer material to suppress the crystallinity thereof. For instance, one modification may involve use of branched polar polymers, linear random copolymers, block copolymers, comb polymers, and/or star-shaped polar polymers. Another modification may include incorporation of an effective amount of solid plasticizers in the polar polymer material, as discussed in greater detail below.

Various properties of the polar polymer material also may be selected and/or modified to maximize ion conductivity. These properties may include, but are not limited to, glass transition temperature, segmental mobility/flexibility of the polymer backbone and/or any side chains attached thereto, orientation of the polymers, etc.

As noted above, the presently disclosed solid electrolyte may include at least one solid plasticizer. The at least one solid plasticizer may be substantially miscible in the polymer framework of the solid plasticizer. The at least one solid plasticizer may include an organic material (e.g., small, solid organic molecules) and/or an oligomeric polymer material, in some embodiments. In various embodiments, the at least one solid plasticizer may be selected from the group including glutaronitrile, succinonitrile, adiponitrile, fumaronitrile, and combinations thereof.

In some embodiments, a plurality of solid plasticizers may be present in the polymer framework, where each plasticizer may independently include an organic material (e.g., small, solid organic molecules) and/or an oligomeric polymer material. Particularly, each plasticizer may independently be glutaronitrile, succinonitrile, adiponitrile, fumaronitrile, etc. Moreover, the dimensions of at least two, some, a majority, or all of the plasticizers may be the same or different as one another.

In some embodiments, the total amount of solid plasticizer may be in a range from about 20 wt. % to about 80 wt. % based on the total weight of the solid electrolyte.

As additionally noted above, the solid polymer electrolyte may include at least one electrolyte salt. In some embodiments, the at least one electrolyte salt may comprise an organic salt. In some embodiments, the at least one electrolyte salt may comprise an inorganic salt. Suitable electrolyte salts may include, but are not limited to, LiTFSI, $LiPF_6$, $LiBF_4$, $LiClO_4$, $LiCF_3SO_3$, $LiN(CF_3SO_2)_2$, $LiSbFg$, $LiAsF_6$, $LiN(CF_3CF_2SO_2)_2$, $(C_2H_5)_4NBF_4$, $(C_2H_5)_3CH_3NBF_4$, LiI, combinations thereof, etc. In some embodiments, the total amount of electrolyte salt may be in a range from about 10 wt. % to about 50 wt. % based on the total weight of the solid electrolyte.

The solid polymer electrolyte is distinguishable from conventional liquid electrolytes, as well as gel polymer electrolytes including an ionic liquid therein. In other words, the presently disclosed solid polymer electrolyte may be an all solid polymer electrolyte, and does not include any liquid or gel components therein. The presently disclosed solid polymer electrolyte may also be transparent in some aspects. Additionally, the solid polymer electrolyte may have an ion conductivity in a range from about $10^{-7}$ S/cm to about $10^{-3}$ S/cm.

Methods of making the presently disclosed solid polymer electrolyte may include synthesis, polymerization, solvation, etc. processes as known in the art. In one particular, non-limiting embodiment, a method of making the presently disclosed polymer electrolyte may include: (a) combining the polymer framework, the at least one plasticizer, and the at least one electrolyte salt in an appropriate solvent; and (b) removing the solvent to obtain the solid polymer electrolyte. Exemplary solvents may include, but are not limited to, acetone, methanol, tetrahydrofuran, etc. In some embodiments, one or more experimental parameters may be optimized to facilitate the dissolving of the polymer framework, plasticizer, and electrolyte salt in the solvent. These experimental parameters may include the components remain in the solvent, agitation/stirring of the solvent, etc.

Electrochromic Device

An exemplary, non-limiting schematic of an electrochromic device 100 comprising a solid polymer electrolyte is show in FIG. 1, according to one embodiment. It is important to note that the electrochromic device 100 of FIG. 1 may be implemented in combination with other devices/features/components described herein, such as those described with reference to other embodiments/aspects. The electrochromic device 100 may be used in various applications and/or in permutations, which may or may not be noted in the illustrative embodiments/aspects described herein. For instance, the electrochromic device 100 may include more or less features/components than those shown in FIG. 1, in some embodiments. Additionally, unless otherwise specified, one or more components of the electrochromic device 100 may be of conventional material, design, and/or fabricated using known techniques (e.g., sputtering, chemical vapor deposition (CVD), spray coating, spin coating, printing, etc.), as would be appreciated by skilled artisans upon reading the present disclosure.

As shown in FIG. 1, the electrochromic device 100 includes a first transparent substrate 102 and a second transparent substrate 104 in spaced, parallel relation with one another. The first substrate 102 includes an interior surface 106 and an exterior surface 108. Likewise, the second substrate 104 includes an interior surface 110 and an exterior surface 112, where the interior surface 110 of the second substrate 104 faces the interior surface 106 of the first substrate 102. The first and second substrates 102, 104 may have the same or different dimensions, comprise the same or different material, etc. Suitable material for the first substrate 102 and/or the second substrate 104 may include, but is not limited to, glass, polymeric materials, plastic materials, and/or other materials which are transparent in at least part of the visible region of the electromagnetic spectrum. In some embodiments, the first and second substrates 102, 104 may comprise glass.

As also shown in FIG. 1, a first transparent electrically conductive film 114 is deposited on the interior surface 106 of the first substrate 102 to act as an electrode. A second transparent electrically conductive film 116 is also deposited on the interior surface 110 of the second substrate 104 to act as electrode. The first and second electrically conductive films 114, 116 may have the same or different dimensions, comprise the same or different material, etc. The first and second electrically conductive films 114, 116 may also each independently have a single layer or multilayer structure. Suitable material for the first and second electrically conductive films 114, 116 may include, but is not limited to, tin doped indium oxide (ITO), fluorine doped indium oxide, antimony doped indium oxide, zinc doped indium oxide, aluminum doped zinc oxide, combinations thereof, and/or other such transparent material exhibiting sufficient electrical conductance. In preferred aspects, the first and second electrically conductive films 114, 116 may comprise ITO.

The electrochromic device 100 may additionally include an electrical power supply (not shown) configured to supply voltage between the first and second electrically conductive films 114, 116.

As further shown in FIG. 1, a first layer 118 of electrochromic material is deposited on the interior surface 120 of the first electrically conductive film 114. This electrochromic material is configured to effect a reversible color change upon reduction (gain of electrons) or oxidation (loss of electron) caused by exposure to an electrical current. In some embodiments, the electrochromic material of the first layer 118 may be configured to change from a transparent state to a colored state, or from a colored state to another colored state, upon oxidation or reduction. In some embodiments, the electrochromic material of the first layer 118 may be a polyelectrochromic material in which more than two redox states are possible, and may thus exhibit several colors.

In some embodiments, the electrochromic material of the first layer 118 may be organic electrochromic material, an inorganic electrochromic material, a mixture of both, etc. The electrochromic material of the first layer 118 may also be a reduction colored material (i.e., a material that becomes colored upon acquisition of electrons), or an oxidation colored material (i.e., a material that becomes colored upon the loss of electrons).

In some embodiments, the electrochromic material of the first layer 118 may include a metal oxide such as $MoO_3$, $V_2O_5$, $Nb_2O_5$, $WO_3$, $TiO_2$, $Ir(OH)_x$, $SrTiO_3$, $ZrO_2$, $La_2O_3$, $CaTiO_3$, sodium titanate, potassium niobate, combinations thereof, etc. In some embodiments, the electrochromic material may include a conductive polymer such as poly-3,4-ethylenedioxy thiophene (PEDOT), poly-2,2'-bithiophene, polypyrrole, polyaniline (PANT), polythiopene, polyisothianaphthene, poly(o-aminophenol), polypyridine, polyindole, polycarbazole, polyquinone, octacyanophthalocyanine, combinations thereof, etc. Moreover, the electrochromic material of the first layer 118 may include materials, such as viologen, anthraquinone, phenocyazine, combinations thereof, etc.

While not shown in the embodiment of FIG. 1, an optional second layer of electrochromic material may be deposited on the interior surface 122 of the second electrically conductive film 116. The optional second layer of electrochromic material may have the same or different dimensions, comprise the same or different material/composition, etc., as the first layer 118 of electrochromic material.

As further shown in FIG. 1, a solid polymer electrolyte 124, such as those disclosed herein, is positioned between the first layer 118 of electrochromic material and the second electrically conductive film 116. In embodiments where the electrochromic device 100 includes the first layer 118 of electrochromic and the optional second layer of electrochromic material, the solid polymer electrolyte 124 may be positioned therebetween.

In some embodiments, the electrochromic device 100 of the present disclosure includes a solid polymer electrolyte, such as the solid polymer electrolyte 124 described above, and does not include any liquid or gel electrolyte.

The use of the solid polymer electrolyte 124 in the electrochromic device 100 provides several advantages. For instance, the solid polymer electrolyte disclosed herein (i) has sufficient mechanical strength yet is versatile in shape so as to allow easy formation into thin films, and thin-film shaped products; (ii) avoids issues related to adhesion and print processing affecting conventional electrolytes; (iii) provides stable contact between the electrolyte/electrode interfaces (those with and without the electrochromic material coating thereon); (iv) avoids the problem of leakage commonly associated with liquid electrolytes; (v) has desirable non-toxic and non-flammable properties; (vi) avoids problems associated with evaporation due to its lack of vapor pressure; (vii) exhibits improved ion conductivities as compared to convention polymer electrolytes; etc.

Figure 2A:
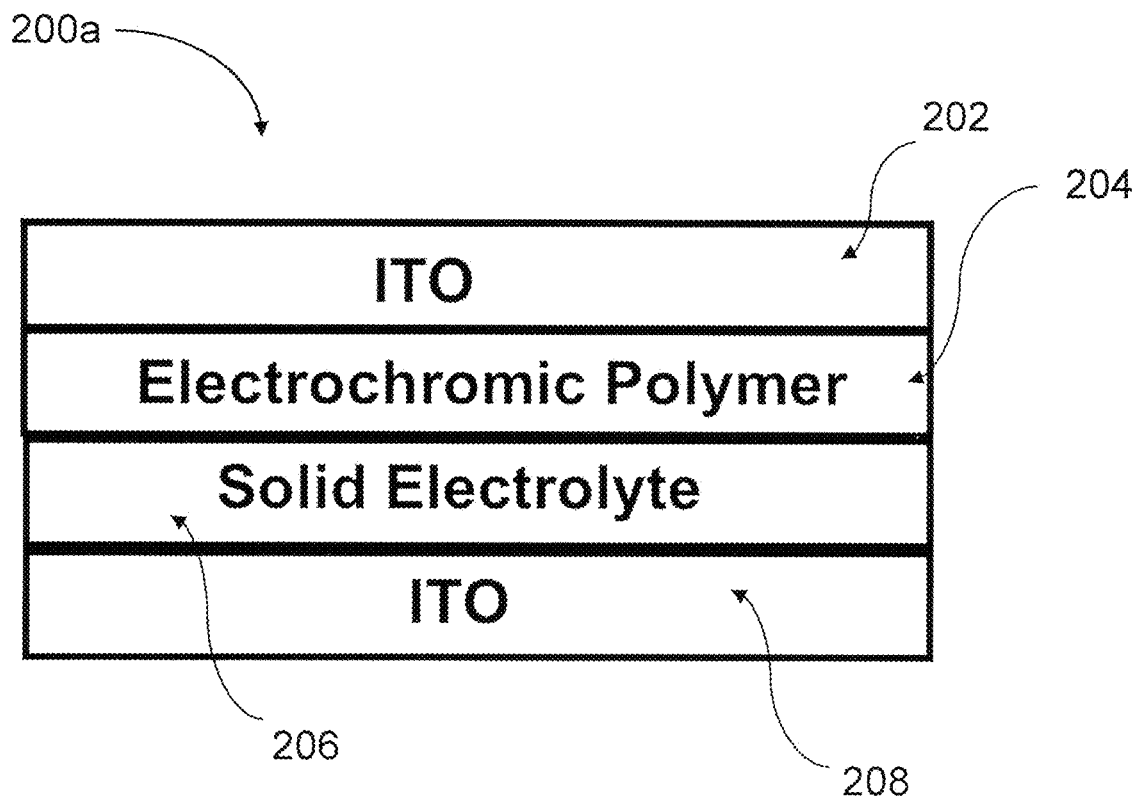
FIG. 2A is a sectional view of an example of an electrochromic device with the solid polymer electrolyte therein.

Another example of an electrochromic device 200a with the solid polymer electrolyte as disclosed herein is shown in FIG. 2A. The electrochromic device 200a may include a first and a second ITO films 202, 208 to act as electrodes. A layer of electrochromic polymer 204 is deposited on an interior surface of the first ITO film 202 and configured to effect a reversible color change upon reduction (gain of electrons) or oxidation (loss of electron) caused by exposure to an electrical current. In some embodiments, the electrochromic polymer 204 may include similar material as the first layer of the electrochromic material 118. A layer of solid electrolyte 206, such as those disclosed herein, is positioned between the layer of electrochromic polymer 204 and the second ITO film 208. In some embodiments, the electrochromic polymer 204 may be an embodiment of the solid polymer electrolyte 124 as disclosed herein.

Figure 2B:
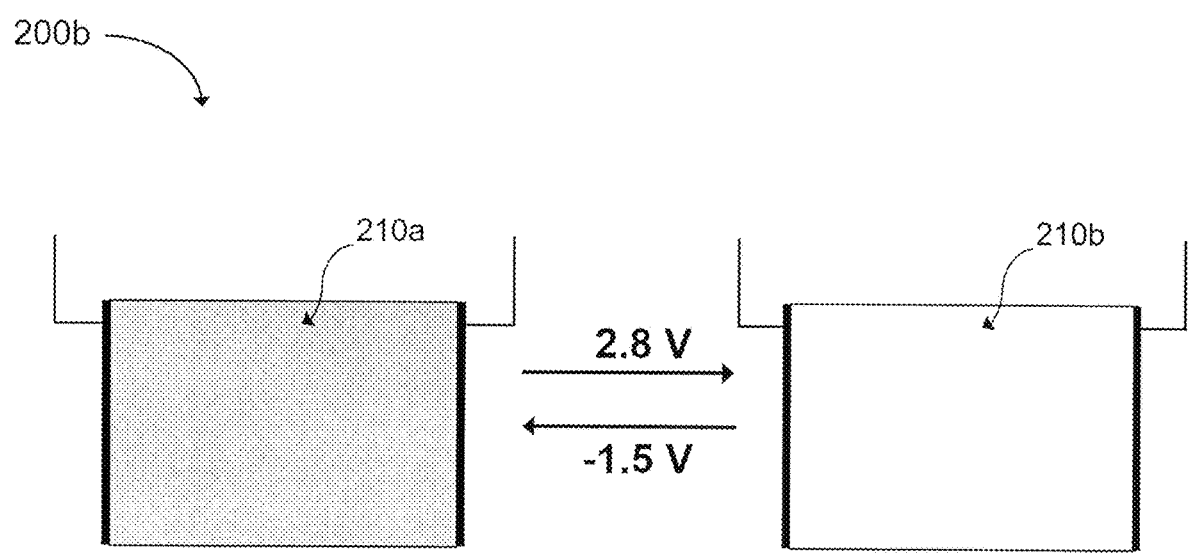
FIG. 2B shows that the electrochromic device of FIG. 2A can reversibly switch between 2.8V and −1.5V.

FIG. 2B shows an illustration 200b of the operation of the electrochromic device 200a of FIG. 2A. The electrochromic device 200a can turn into transparent state 210b at 2.8V and change back to tinted state 210a at −1.5V. In some embodiments, the electrochromic device 200a may have more than two redox states, and may thus exhibit several colors.

EXAMPLES

An exemplary solid polymer electrolyte according to the present disclosure was prepared as follows.

The following components were combined: 40 wt. % PEO having a molecular weight of 1,000,000; 10 wt. % PEO having a molecular weight of 1,500; 30 wt. % succinonitrile; and 20 wt. %, LiClO$_4$. The combined components were mixed in an acetone solvent and stirred overnight to obtain a solution. The solution was processed and deposited on a PEDOT-PSS electrochromic layer via spin-coating, dip-coating, drop-casting, blade coating, screen printing, etc. After drying the solvent, the resulting solid electrolyte was found to be transparent with an ion conductivity of about $10^{-4}$ S/cm. The electrochromic device comprising the resulting solid electrolyte includes a first transparent ITO coated glass electrode on which the PEDOT-PSS electrochromic layer is deposited, as well as a second transparent ITO-coated glass electrode, where the solid electrolyte is located/sandwiched between the transparent ITO/PEDOT-PSS layers and the second transparent ITO glass layer. This particular electrochromic device was found to switch to a blue color at 5 V, and switch back to colorless at −2 V.

APPLICATIONS/USES

Embodiments of the presently disclosed solid polymer electrolyte may be used in various applications, devices, industries etc. Particular applications of the presently disclosed solid polymer electrolyte involve use in electrochromic devices. Electrochromic devices are often associated with smart window and display technology, e.g., anti-glare car mirrors; smart windows configured to modulate the transmission or reflected solar radiation for use in cars, aircrafts, buildings, and the like; protective eyewear; camouflage and/or chameleonic materials; etc.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A solid polymer electrolyte, comprising:
   a polymer framework comprising a polar polymer material;
   at least one solid oligomeric plasticizer selected from the group consisting of:
   glutaronitrile, succinonitrile, adiponitrile, fumaronitrile, and combinations thereof; and
   at least one electrolyte salt,
   wherein the polar polymer material is in a range from 15 wt. % to about 80 wt. %; and
   wherein the at least one electrolyte salt is in a range from about 10 wt. % to about 50 wt. %.

2. The solid polymer electrolyte of claim 1, wherein the polar polymer material has an average molecular weight of about 10,000 Daltons or greater.

3. The solid polymer electrolyte of claim 1, wherein the polar polymer material comprises one or more of: C, N, F, O, H, P, and F.

4. The solid polymer electrolyte of claim 1, wherein the polar polymer material is selected from the group consisting of: polyethylene oxide, poly(vinylidene fluoride-hexafluoropropylene), poly(methyl methacrylate), polyvinyl nitrile, and combinations thereof.

5. The solid polymer electrolyte of claim 1, wherein the at least one solid oligomeric plasticizer comprises an organic material substantially miscible with the polymer framework.

6. The solid polymer electrolyte of claim 1, wherein the at least one solid oligomeric plasticizer comprises an oligomeric polymer material substantially miscible with the polymer framework.

7. The solid polymer electrolyte of claim 1, wherein a total amount of the solid oligomeric plasticizer is in a range from about 20 wt. % to about 80 wt. %.

8. The solid polymer electrolyte of claim 1, wherein the at least one electrolyte salt comprises an organic salt.

9. The solid polymer electrolyte of claim 1, wherein the at least one electrolyte salt comprises an inorganic salt.

10. The solid polymer electrolyte of claim 1, wherein the at least one electrolyte salt is selected from the group consisting of: LiTFSI, LiPF$_6$, LiBF$_4$, LiClO$_4$, LiCF$_3$SO$_3$, LiN(CF$_3$SO$_2$)$_2$, LiSbF$_6$, LiAsF$_6$, LiN(CF$_3$CF$_2$SO$_2$)$_2$, (C$_2$H$_5$)$_4$NBF$_4$, (C$_2$H$_5$)$_3$CH$_3$NBF$_4$, LiI, and combinations thereof.

11. An electrochromic device, comprising:
   a first electrode;
   a second electrode;
   an electrochromic material deposited on at least the first electrode; and
   a solid polymer electrolyte disposed between the electrochromic material and the second electrode, wherein the solid polymer electrolyte comprises a polymer framework, at least one solid oligomeric plasticizer selected from the group consisting of: glutaronitrile, succinonitrile, adiponitrile, fumaronitrile, and combinations thereof, and at least one electrolyte salt;
   wherein the polar polymer material is in a range from 15 wt. % to about 80 wt. %; and
   wherein the at least one electrolyte salt is in a range from about 10 wt. % to about 50 wt. %.

12. The electrochromic device of claim 11, wherein the polymer framework comprises a polar polymer material having an average molecular weight of about 10,000 Daltons or greater.

13. The electrochromic device of claim 12, wherein a total amount of the polar polymer material is in a range from about 15 wt. % to about 80 wt. % based on a total weight of the solid polymer electrolyte.

14. The electrochromic device of claim 12, wherein the polar polymer material is selected from the group consisting of: polyethylene oxide, poly(vinylidene fluoride-hexafluoropropylene, poly(methyl methacrylate), polyvinyl nitrile, and combinations thereof.

15. The electrochromic device of claim 11, wherein the at least one solid oligomeric plasticizer comprises an organic material substantially miscible with the polymer framework.

16. The electrochromic device of claim 11, wherein the at least one solid oligomeric plasticizer comprises an oligomeric polymer material substantially miscible with the polymer framework.

17. The electrochromic device of claim 11, wherein a total amount of the solid oligomeric plasticizer is in a range from about 20 wt. % to about 80 wt. % based on a total weight of the solid polymer electrolyte.

18. The electrochromic device of claim 11, wherein the at least one electrolyte salt comprises an organic salt and/or inorganic salt.

19. The electrochromic device of claim 11, wherein the at least one electrolyte salt is selected from the group consisting of: LiTFSI, $LiPF_6$, $LiBF_4$, $LiClO_4$, $LiCF_3SO_3$, $LiN(CF_3SO_2)_2$, $LiSbF_6$, $LiAsF_6$, $LiN(CF_3CF_2SO_2)_2$, $(C_2H_5)_4NBF_4$, $(C_2H_5)_3CH_3NBF_4$, LiI, and combinations thereof.

20. The electrochromic device of claim 11, wherein the device further comprises a transparent substrate.

\* \* \* \* \*